UNITED STATES PATENT OFFICE.

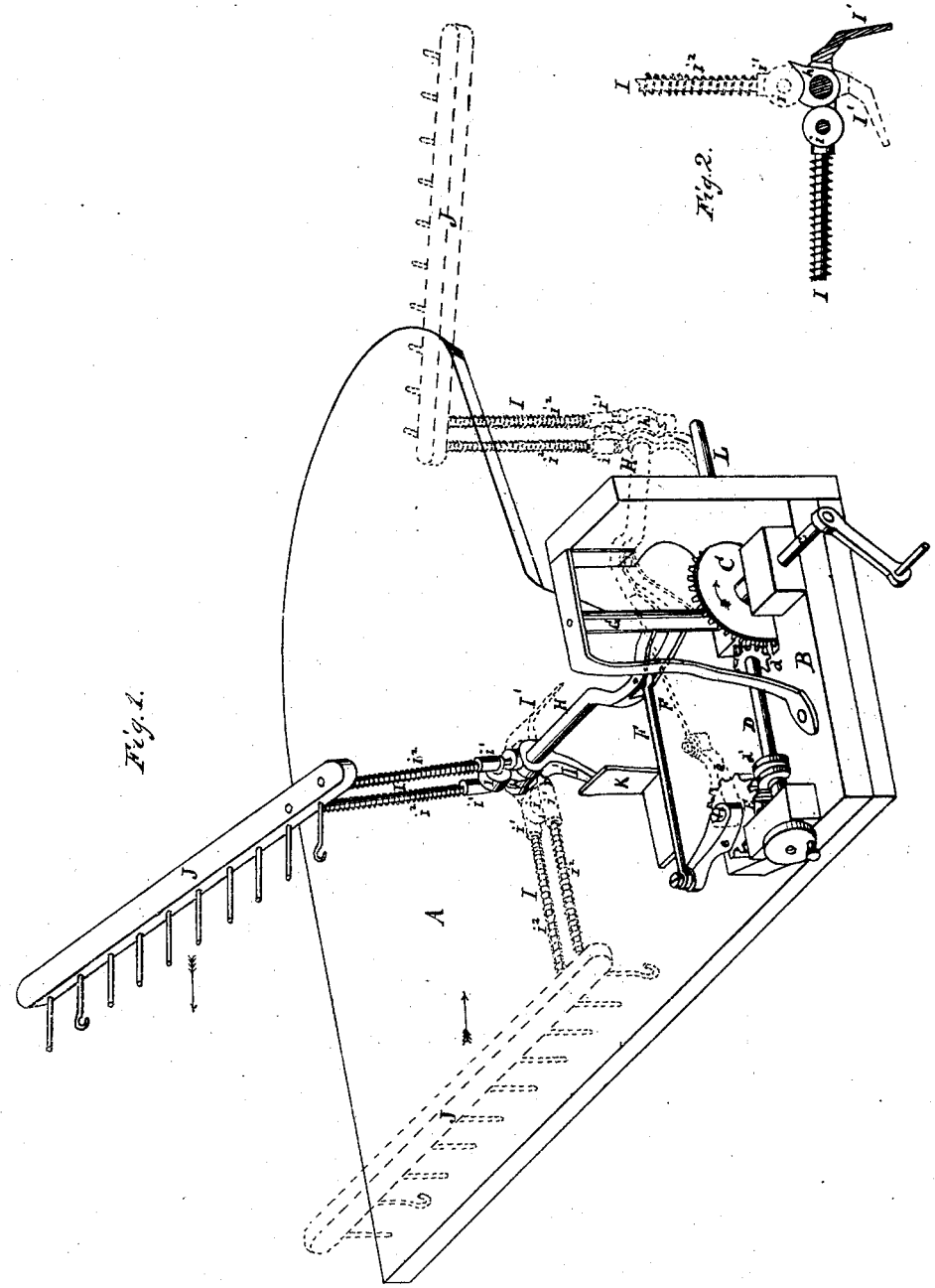

WM. H. SEYMOUR AND AARON PALMER, OF BROCKPORT, NEW YORK.

IMPROVEMENT IN RAKES FOR HARVESTERS.

Specification forming part of Letters Patent No. 34,986, dated April 15, 1862.

*To all whom it may concern:*

Be it known that we, WILLIAM H. SEYMOUR and AARON PALMER, both of Brockport, in the county of Monroe and State of New York, have invented certain new and useful Improvements in Automatic Rakes for Harvesting-Machines, of which the following is a full, clear, and exact description, reference being had to the accompanying drawings, which make part of this specification, and in which—

Figure 1 represents a view in perspective of a portion of a harvesting-machine with our improvements applied thereto, the black lines indicating the relative position of the several parts when the rake is moving forward and on the point of descending upon the grain lying on the platform, the blue lines the attitude assumed when the rake has descended upon the platform preparatory to commencing its retrograde movement, and the red lines the attitude assumed by the rake after discharging the gavel and just before the commencement of its forward movement. Fig. 2 represents a vertical transverse section through the rake-arm and tripping mechanism, the black lines representing the position of the cam and roller when the rake rests upon the platform, and the red lines their position when the rake is elevated.

Our invention relates to that class of vibrating harvester-rakes in which the arm carrying the rake is located directly behind the cutting apparatus and vibrated by gearing placed at one end of the same, so that the rake describes the arc of a circle the center of which is near the inner edge of the platform over which the rake traverses, and has for its object a new method of giving the proper motions to the rake in order to facilitate the discharge of the grain from the platform in the best manner.

The accompanying drawings represent a convenient arrangement of parts for carrying out the objects of our invention.

Upon the stubble side of the platform A a gearing-frame, B, of any suitable construction, is secured. A bevel-wheel, C, upon the driving-shaft $c$ drives a corresponding pinion, $d$, on the counter-shaft D, which carries a worm, $d'$. This worm drives a pinion, E, turning on a vertical shaft, and carrying a wrist-pin or crank, $e$, to which a pitman, F, is attached.

A vertical post, G, is mounted in suitable bearings in the gearing-frame B, so as to be capable of turning freely on its axis. A rigid arm or lever, H, projects horizontally from this turning post G, and vibrates freely over the platform and parallel to it. The pitman F is jointed to this arm, and gives motion to it.

A stationary cam, $h$, of the form shown in Fig. 2 of the drawings, is secured upon the outer end of the vibrating lever H. An arm, I, (shown in the drawings as consisting of two parallel rods,) is secured upon the vibrating arm at right angles thereto, so as to be capable of revolving freely thereon. The rake-head J is attached to and carried by these rods.

A roller, $i$, is placed between the parallel rods I, and has its bearings in sockets or sleeves $i'$, sliding upon the parallel rods I. The roller is constantly pressed upon the stationary cam $h$ by means of spiral springs $e^2$, encircling the parallel rods. These rods extend below the vibrating arm H, and are united and bent into the form shown in the drawings, so as to form a tripping-lever, I', to raise and lower the rake.

A stop, K, is placed upon the platform, to trip the lever on its forward movement, and another one, L, is inserted into the back of the gearing-frame, to elevate the rake-head at the proper moment.

The operation of the machine is as follows: We will assume the parts to occupy the position represented by the black lines in Fig. 1 of the drawings, and that their movements are in the direction indicated by the red arrows. As the stalks are severed by the cutting apparatus they fall upon the platform A with their heads to the rear. The rake J moves forward until its tripping-lever I' strikes upon the stop-block K, when it is tilted forward until the roller $i$ has been lifted out of its seat in the stationary cam $h$, when the rake falls by its own weight, its position being shown by the blue lines in Fig. 1. The lifting of the roller is facilitated by the yielding of its springs, which enable it to pass over the cam more readily. When the rake has fallen, it immediately begins to move backward in the arc of a circle of which the turning post G forms the center, dragging the grain with it, the rake-teeth being held firmly down upon the grain by the pressure of the spring-roller $i$ upon the under surface of the stationary cam $h$. This retrograde movement is continued until the grain is discharged from the platform. The tripping-lever I' then strikes the stop-pin L and raises the rake, the parts occupying the position shown by the red lines in the drawings. The rake then commences its forward movement again, until it strikes the detent K, when it again descends upon the platform, and the process above described is repeated. As the rake rises at the termination of its backward stroke, the roller $i$ rises over the point of the cam $h$ and slips into its seat in the cam, where it remains during the forward movement of the rake, being held in position by its springs. The rake is thus securely held up until the proper moment for it to fall, and yet but a slight exertion of force is required to disengage it, and is also held firmly down upon the grain, when raking off, until the proper moment for it to rise has arrived.

What we claim as our invention, and desire to secure by Letters Patent, is—

1. The combination, in an automatic rake for a harvesting-machine, of the following elements, viz: first, a post or standard capable of turning freely in its bearings; second, an arm secured rigidly to the post and capable of traversing only in a plane perpendicular to it; third, a stationary cam on said arm; fourth, a rake-head capable of revolving freely around said arm in a plane perpendicular to it: fifth, a roller carried by the arm to which the rake-head is attached, and capable of yielding freely in its bearings to traverse over the stationary cam and hold the rake-head in the proper position; sixth, a tripping-lever upon the rod which carries the rake-head; and, seventh, suitable stops or detents upon the front and rear of the platform to raise and depress the rake at the proper moments, the whole operating substantially in the manner described.

2. The combination of the stationary cam $h$ upon the end of the vibrating arm, which carries the rake, with the yielding roller $i$ upon the rake-rod, when operating substantially in the manner described, for the purpose of holding the rake-head up during its forward movement and of pressing it down firmly upon the grain when raking off.

3. The combination of the stationary cam $h$, the yielding roller $i$, and the tripping-lever I', substantially in the manner and for the purpose specified.

4. The combination of the yielding roller $i$ with the rake-rods I, as herein described, for the purpose set forth.

In testimony whereof we have hereunto subscribed our names.

WILLIAM H. SEYMOUR.
AARON PALMER.

Witnesses:
GEO. H. ALLEN,
WILLIAM STOUGHTON.